UNITED STATES PATENT OFFICE

2,149,212

COLORED RUBBER PRODUCTS AND A PROCESS OF PRODUCING THEM

Ernst Fischer, Offenbach-on-the-Main, Germany, assignor to General Aniline Works, Inc., New York, N. Y., a corporation of Delaware No Drawing. Application December 28, 1936, Serial No. 117,975. In Germany January 3, 1936

7 Claims. (Cl. 18—50)

The present invention relates to colored rubber products and to a process of producing them.

In my copending application Serial No. 92,253, filed July 23, 1936, there is disclosed a process for coloring rubber products (which term is meant to include natural rubber as well as the synthetic products which have a constitution and properties similar to those of natural rubber, as for example polymerization products of butadiene hydrocarbons such as butadiene or isoprene) by incorporating with the rubber products or mixtures containing them, prior to vulcanization, water-insoluble mono-azo-dyestuffs of the general formula:

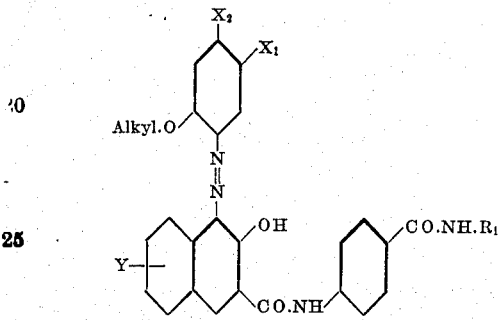

wherein $R_1$ stands for a member of the group consisting of hydrogen, alkyl, benzyl, a radical of the benzene and naphthalene series and a hydro-aromatic radical, Y for a member of the group consisting of hydrogen, halogen and alkoxy, $X_1$ for a member of the group consisting of hydrogen, alkyl, alkoxy and the group —$NH.CO.R_2$, $X_2$ for a member of the group consisting of alkoxy and the group —$NH.CO.R_2$, always one of the two substituents $X_1$ and $X_2$ being the group —$NH.CO.R_2$, and wherein $R_2$ stands for a member of the group consisting of alkyl, benzyl, a radical of the benzene and naphthalene series and a hydroaromatic radical. With these dyestuffs there are obtained clear violet and blue shades having very good fastness properties. They are adapted for the different kinds of hot and cold vulcanization processes. They are insoluble in benzine, do not bleed into rubber when the rubber products are worked up and do not give rise to that phenomenon which is known as blushing or efflorescence when the rubber articles are stored.

Now, I have found that valuable rubber dyeing of similar good properties may be obtained by using in the above mentioned process such dyestuffs as contain the —$CO.NH.R_1$ group in the arylide radical of the coupling component in meta-position and have in ortho- or para-position to the —$CO.NH.R_1$ group further substituents, i. e. mono-azo-dyestuffs of the following general formula:

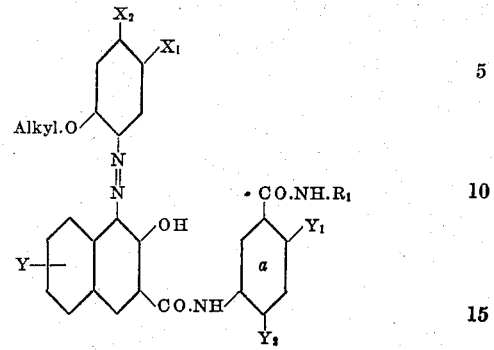

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group —$NH.CO.R_2$, $X_2$ for a member of the group consisting of alkoxy and the group —$NH.CO.R_2$, always one of the two substituents $X_1$ and $X_2$ being the group —$NH.CO.R_2$, $R_2$ stands for a member of the group consisting of alkyl, benzyl, a radical of the benzene and naphthalene series and a hydroaromatic radical, and wherein the benzene nucleus $a$ is substituted in at least one of the two positions $Y_1$ and $Y_2$ by a member of the group consisting of alkyl, alkoxy, phenoxy and halogen.

Since the dyestuffs do not bleed into white rubber they are distinctly superior, especially with regard to this behavior, to the dyestuffs disclosed in German Patent No. 601,254. In German Patent No. 604,299 there is described a process for producing blue and violet rubber dyeings of good fastness properties by using disazo-dyestuffs which, however, cannot always be obtained on a technical scale in the necessary uniform quality. Therefore, the replacement of the disazo-dyestuffs by mono-azo-dyestuffs, which yield rubber dyeings of the same good fastness properties, constitutes a valuable advance in the art.

The following examples serve to illustrate the invention, but they are not intended to limit it thereto; the parts are by weight:

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 2 parts of the dyestuff obtainable by coupling diazotized 1-amino-2.5-diethoxy-4-benzoylaminobenzene with 2.3-hydroxynaphthoyl-1'- amino-2'- methylbenzene-5'-

(carbonylaminobenzene). The mixture is vulcanized in a vulcanization press for 12 minutes at a steam pressure of 3 atmospheres above atmospheric pressure. There is obtained a reddish-blue vulcanizate of very good properties of fastness.

(2) A rubber mixture is prepared in the usual manner from crepe rubber, the usual admixtures and 2 parts of the dyestuff obtainable by coupling diazotized 1-amino-2.5-diethoxy-4-benzoylaminobenzene with 2.3-hydroxynaphthoyl-1'-amino-4'-methoxybenzene-5'-(carbonyl-1''-amino-2''-ethoxy-5''-methylbenzene). The mixture is vulcanized in the cold by immersing it for 8 seconds in a solution of 3 parts of sulfur chloride in 97 parts of benzene. There is obtained a violet vulcanizate which is, as to its fastness properties, very similar to that described in Example 1.

The following table illustrates a series of dyestuffs which may be substituted for those of Examples 1 and 2 and which dye the vulcanizates very fast tints.

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group $-NH.CO.R_2$, $X_2$ for a member of the group consisting of alkoxy and the group $-NH.CO.R_2$, always one of the two substituents $X_1$ and $X_2$ being the group $-NH.CO.R_2$, $R_2$ stands for a member of the group consisting of alkyl, benzyl, a radical of the benzene and naphthalene series and a hydroaromatic radical, and wherein the benzene nucleus $a$ is substituted in at least one of the two positions $Y_1$ and $Y_2$ by a member of the group consisting of alkyl, alkoxy, phenoxy and halogen, and then vulcanizing the mixture.

2. The process of producing colored rubber products which comprises mixing a rubber product with a water-insoluble mono-azo-dyestuff corresponding to the following general formula:

Dyestuffs from:

| | Diazo compound of— | Coupled with— | Shade |
|---|---|---|---|
| 1 | 1-amino-2, 5-diethoxy-4-benzoylaminobenzene | 2, 3-hydroxynaphthoyl-1'-amino- -2'-methylbenzene-5'-(carbonylaminobenzene) | Blue. |
| 2 | 1-amino-2, 5-dimethoxy-4-benzoylaminobenzene | -2'-methoxybenzene-5'-(carbonylaminobenzene) | Do. |
| 3 | 1-amino-2, 5-diethoxy-4-benzoylaminobenzene | -2'-chlorobenzene-5'-(carbonylaminobenzene) | Violet. |
| 4 | ----do---- | -2'-phenoxybenzene-5'-(carbonylaminobenzene) | Blue. |
| 5 | 1-amino-2, 5-dimethoxy-4-benzoylaminobenzene | -2'-methylbenzene-5'-(carboxylic acid-cyclohexylamide) | Violet. |
| 6 | 1-amino-2, 5-diethoxy-4-benzoylaminobenzene | -2'-methylbenzene-5'-(carboxylic acid-benzyl-amide) | Blue. |
| 7 | 1-amino,2, 5-dimethoxy-4-benzoylaminobenzene | -2'-methylbenzene-5'-(carboxylic acid-ethyl-amide) | Violet. |
| 8 | ----do---- | -2'-methylbenzene-5'-(carboxylic acid-methyl-amide) | Do. |
| 9 | ----do---- | -2'-methylbenzene-5'-(carboxylic acid-amide) | Do. |
| 10 | ----do---- | -2', 4'-diethoxybenzene-5'-(carbonylaminobenzene) | Do. |
| 11 | 1-amino-2, 5-diethoxy-4-benzoylaminobenzene | -4'-chlorobenzene-5'-(carbonylaminobenzene) | Do. |
| 12 | ----do---- | -2'-bromobenzene-5'-(carbonylaminobenzene) | Do. |
| 13 | 1-amino-2, 4-dimethoxy-5-benzoylaminobenzene | -2'-methylbenzene-5'-(carbonylaminobenzene) | Do. |
| 14 | 1-amino-2, 4-dimethoxy-5-benzoylaminobenzene | ----do---- | Do. |
| 15 | 1-amino-2-methoxy-5-methyl-4-benzoylaminobenzene | ----do---- | Do. |
| 16 | 1-amino-2-methoxy-4-acetaminobenzene | ----do---- | Do. |
| 17 | 1-amino-2, 5-dimethoxy-4-acetaminobenzene | | Do. |
| 18 | 1-amino-2, 5-diethoxy-4-phenacetylaminobenzene | -2'-chlorobenzene-5'-(carbonylaminobenzene) | Blue. |
| 19 | 1-amino-2, 5-diethoxy-4-hexahydrobenzoyl-aminobenzene | -2'-methylbenzene-5'-(carbonylaminobenzene) | Violet. |
| 20 | 1-amino-2, 5-dimethoxy-4-(alpha-) naphthoylaminobenzene | ----do---- | Do. |
| 21 | 1-amino-2, 5-diethoxy-4-(4'-chloro) benzoylaminobenzene | | Blue. |
| 22 | 1-amino-2, 5-diethoxy-4-benzoylaminobenzene | -2'-chlorobenzene-5'-(carbonylaminobenzene) | Violet. |
| 23 | ----do---- | -2'-methoxybenzene-5'-(carbonylaminobenzene) | Do. |
| 24 | ----do---- | -2'-methylbenzene-5'-(carboxylic acid-cyclohexylamide) | Do. |
| 25 | ----do---- | -2'-methylbenzene-5'-(carbonyl-1''-amino-4''-chlorobenzene) | Do. |
| 26 | ----do---- | -2', 4'-diethoxybenzene-5'-(carbonylaminobenzene) | Do. |
| 27 | ----do---- | -2'-methoxybenzene-5'-(carbonyl-2''-amino-naphthalene) | Do. |
| 28 | ----do---- | -2'-methylbenzene-5'-(carbonyl-2''-amino-1'', 2'', 3'', 4''-tetra-hydronaphthalene) | Do. |
| 29 | 1-amino-2, 5-diethoxy-4-(4'-chloro) benzoylaminobenzene | -2'-methylbenzene-5'-(carbonyl-1''-amino-2''-methyl-6''-chlorobenzene) | Blue. |
| 30 | 1-amino-2, 5-diethoxy-4-benzoylaminobenzene | -2'-methylbenzene-5'-(carbonylaminobenzene) | Violet. |
| 31 | 1-amino-2, 5-dimethoxy-4-benzoylaminobenzene | 6-bromo-2, 3-hydroxy-naphthoyl-1'-amino- -2'-methylbenzene-5'-(carbonylaminobenzene) | Blue. |
|  |  | ----do---- | Do. |
| 32 | 1-amino-2, 5-diethoxy-4-benzoylaminobenzene | 6-methoxy-2, 3-hydroxy-naphthoyl-1'-amino- -2'-methylbenzene-5'-(carbonylaminobenzene) | Do. |
| 33 | 1-amino-2, 4-dimethoxy-5-benzoylaminobenzene | ----do---- | Violet. |
| 34 | 1-amino-2, 5-dimethoxy-4-benzoylaminobenzene | -2'-methoxybenzene-5'-(carbonylaminobenzene) | Blue. |

I claim:

1. The process of producing colored rubber products which comprises mixing a rubber product with a water-soluble mono-azo-dyestuff corresponding the following general formula:

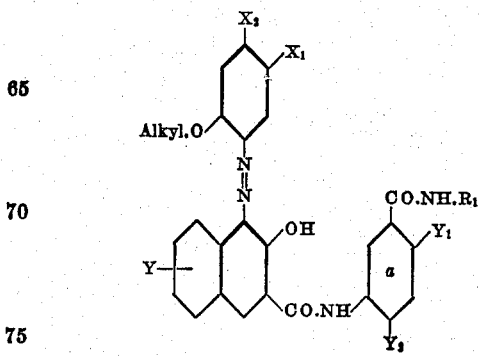

uct with a water-insoluble mono-azo-dyestuff corresponding to the following general formula:

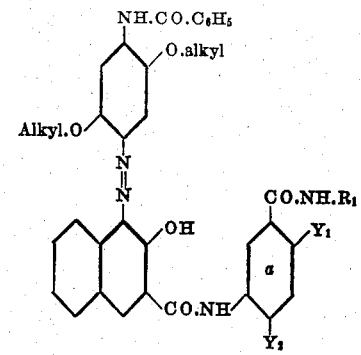

wherein $R_1$ stands for a member of the group consisting of hydrogen, alkyl, benzyl, a radical of the benzene and naphthalene series and a hydroaromatic radical and wherein the benzene nucleus $a$ is substituted in at least one of the two positions $Y_1$ and $Y_2$ by a member of the group consisting of alkyl, alkoxy, phenoxy and halogen, and then vulcanizing the mixture.

3. Colored vulcanized rubber products containing a water-insoluble mono-azo-dyestuff of the following general formula:

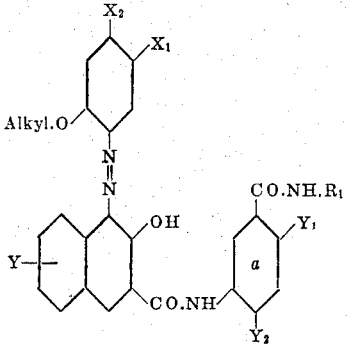

wherein $R_1$ stands for a member of the group consisting of hydrogen, alkyl, benzyl, a radical of the benzene and naphthalene series and a hydroaromatic radical, Y for a member of the group consisting of hydrogen, halogen and alkoxy, $X_1$ for a member of the group consisting of hydrogen, alkyl, alkoxy and the group —NH.CO.$R_2$, $X_2$ for a member of the group consisting of alkoxy and the group —NH.CO.$R_2$, always one of the two substituents $X_1$ and $X_2$ being the group —NH.CO.$R_2$, $R_2$ stands for a member of the group consisting of alkyl, benzyl, a radical of the benzene and naphthalene series and a hydroaromatic radical, and wherein the benzene nucleus $a$ is substituted in at least one of the two positions $Y_1$ and $Y_2$ by a member of the group consisting of alkyl, alkoxy, phenoxy and halogen.

4. Colored vulcanized rubber products containing a water-insoluble mono-azo-dyestuff of the following formula:

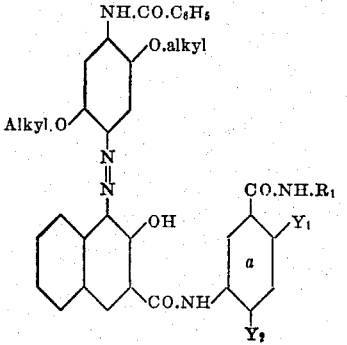

wherein $R_1$ stands for a member of the group consisting of hydrogen, alkyl, benzyl, a radical of the benzene and naphthalene series and a hydroaromatic radical and wherein the benzene nucleus $a$ is substituted in at least one of the two positions $Y_1$ and $Y_2$ by a member of the group consisting of alkyl, alkoxy, phenoxy and halogen.

5. Colored vulcanized rubber products containing a water-insoluble mono-azo-dyestuff of the following formula:

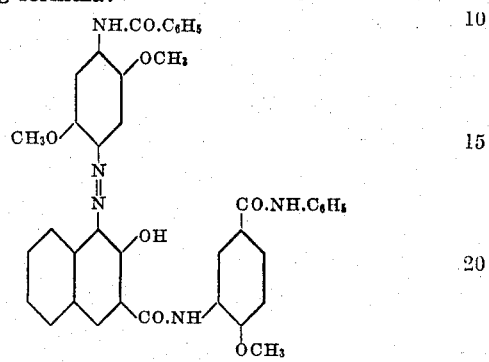

6. Colored vulcanized rubber products containing a water-insoluble mono-azo-dyestuff of the following formula:

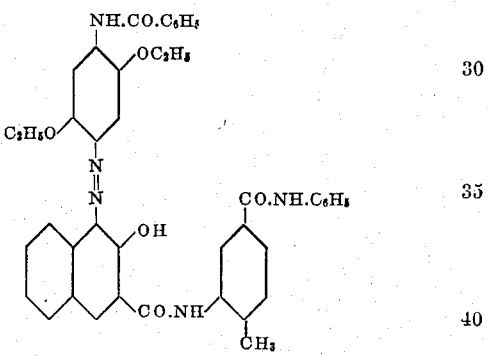

7. Colored vulcanized rubber products containing a water-insoluble mono-azo-dyestuff of the following formula:

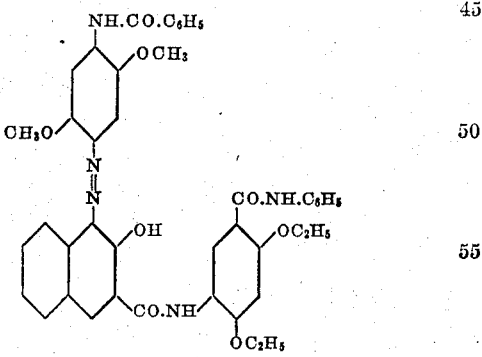

ERNST FISCHER.

CERTIFICATE OF CORRECTION.

Patent No. 2,149,212. February 28, 1939.

ERNST FISCHER.

It is hereby certified that error appears in the printed specification of the above numbered patent requiring correction as follows: Page 2, first column, in the table, under the heading "Diazo compound of-", item 14, for "4-dimethoxy" read 4-diethoxy; same page and column, line 60, claim 1, for the word "water-soluble" read water-insoluble; line 61, same claim, for "the the" read to the; and that the said Letters Patent should be read with this correction therein that the same may conform to the record of the case in the Patent Office.

Signed and sealed this 4th day of July, A. D. 1939.

Henry Van Arsdale (Seal) Acting Commissioner of Patents.